March 27, 1951 — C. E. SCHUMAN — 2,546,348
SERVICE HEAD FITTING
Filed Aug. 19, 1947
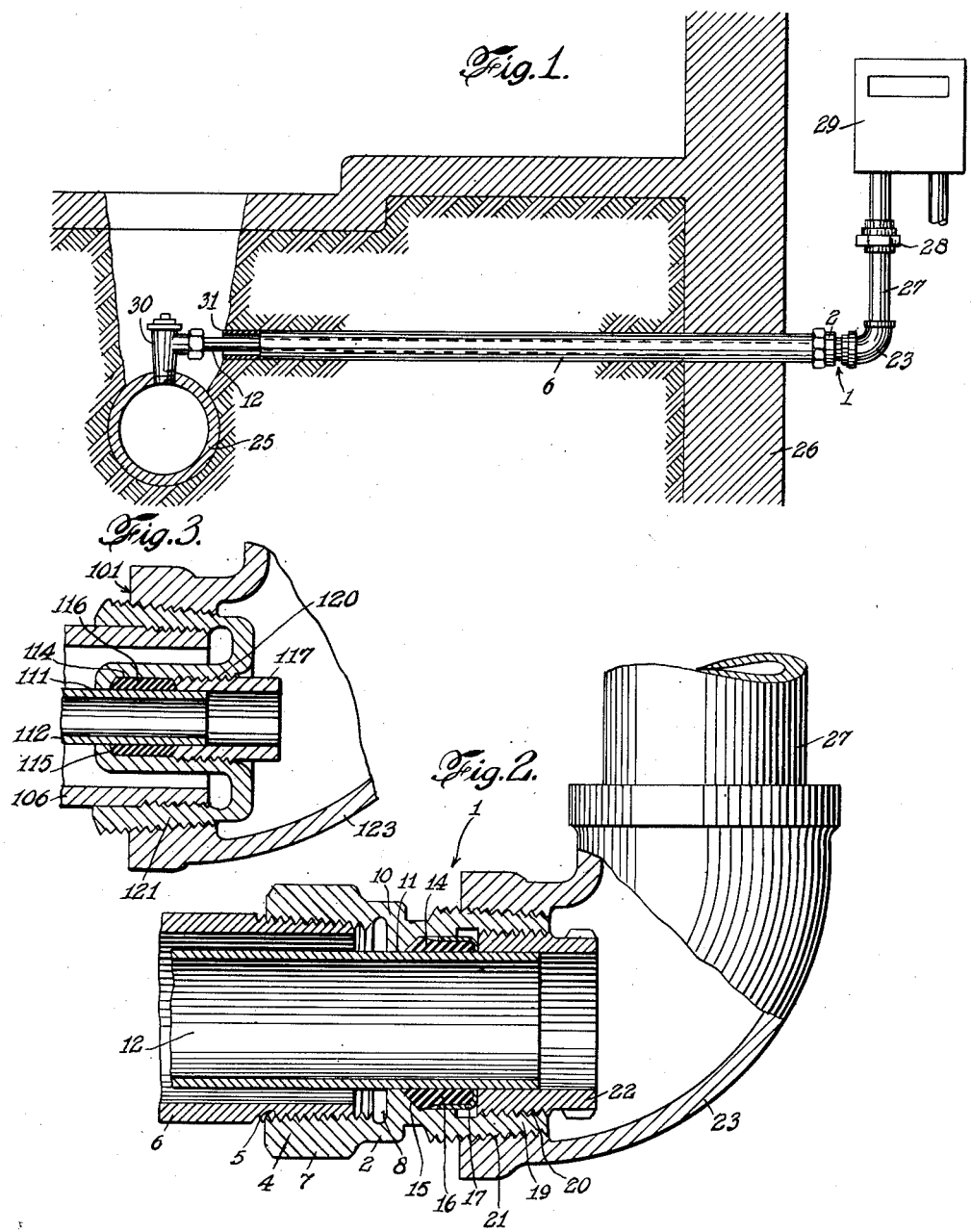
INVENTOR.
CHARLES E. SCHUMAN
BY
Robert E. Burns
ATTORNEY.

Patented Mar. 27, 1951

2,546,348

UNITED STATES PATENT OFFICE 2,546,348

SERVICE HEAD FITTING

Charles E. Schuman, Bradford, Pa., assignor to Dresser Industries, Inc., Cleveland, Ohio, a corporation of Pennsylvania Application August 19, 1947, Serial No. 769,421

9 Claims. (Cl. 285—22)

1

The present invention relates to pipe fittings, and more particularly to pipe fittings for connecting a replacement service pipe with the piping inside a building.

The service pipes for gas, water, or the like extending from a main located beneath the street adjacent a building and supplying the building are often attacked by corrosion making replacement necessary. It has been found more economical in such cases to insert a replacement service line of smaller diameter through the existing service pipe rather than to make another excavation to lay a new service pipe. It has been found preferable to use a copper tube for the replacement service as tube is available in lengths sufficient for the purpose and can readily be drawn through the old service pipe.

In order to block off the old service pipe so that drainage water will not be led into the building and to connect the replacement service tube to the existing piping in the building, specially constructed pipe fittings have been heretofore provided for such purposes. The requirements for such fittings are that a gas-tight connection is formed between the tube and the fitting leading to the meter riser, and that a gas and watertight connection to the old service pipe is provided to avoid the possibility of gas or water entering into the building through the space between the replacement service tube and the old service pipe. Several forms of such fittings are shown in Patent No. 2,268,263, issued to Frederick T. Newell and George E. Szekely, on December 30, 1941. While these fittings have been generally satisfactory, they have been subjected to criticism. The principal disadvantage is that the gasket pressure applying nut is readily removable with an ordinary wrench and thus is subject to tampering. While in service the nut may be connected by a seal wire to the body of the fitting, this does not discourage tampering on the part of curious or ignorant individuals. Should this nut be unscrewed, it would release the pressure on the gaskets and possibly allow gas leakage resulting in an explosion. Another objection is that the fittings, because of their length, prevent the making of connections to meters located in inaccessible locations such as in a corner almost directly against both walls. In order to use the prior fittings in such locations, it is necessary to remove the meters and do a considerable amount of re-piping. The shorter the fitting can be made, the less probable is the necessity that such operations would be required.

2

The present invention aims to overcome the difficulties and disadvantages of prior fittings by providing an improved construction.

An object of the invention is to provide a leakproof fitting which will connect the new service tube to the existing piping in the building and simultaneously seal off the old service pipe to prevent the entry of gas or water from the ground into the building.

Another object of the invention is to provide such a fitting which is economical to manufacture, rugged in construction and durable in use and which makes possible the installation of a replacement service tube with minimum disturbance to the existing piping in the building.

In accordance with the invention, a fitting is provided which includes means to seal off the old service pipe and to make a fluid tight connection between the replacement service tube and the existing piping and in which the fluid tight joint is completely concealed to avoid the possibility of tampering. This is accomplished by providing a gasket bushing secured to the inner surface of the fitting which is completely inaccessible when the piping is in position.

This construction is advantageous in that greater safety is provided by eliminating a possible source of leakage. Further, the construction of the fitting permits its use with an L fitting. Many old service pipes have been made with a T fitting to permit cleaning of the service by removing a plug in one of the horizontal arms of the fitting and running a rod into the service pipe. The presence of this plug is an invitation to gas thieving, as gas may readily be piped out of the T fitting ahead of the meter. Since modern gases are virtually drip and dust free, the cleaning of service pipes is rarely required and, therefore, the use of an L fitting is satisfactory, thus avoiding the tampering hazard.

Other and further objects and advantages of the invention will be apparent from the following description and from the accompanying drawing which shows, by way of example, an embodiment of the invention.

In the drawing:

Fig. 1 is a vertical sectional view illustrating an installation of a replacement service tube using a fitting in accordance with the invention.

Fig. 2 is an enlarged view, partly in elevation and partly in section, showing a fitting in position connecting a replacement service tube to the piping inside a building.

Fig. 3 is an enlarged view in vertical section showing another embodiment of a fitting in accordance with the invention connecting a replacement service tube to the piping inside a building.

Referring to the drawing, and more particularly to Fig. 2, there is shown a fitting 1 in accordance with the invention. The fitting may be made of any suitable material, preferably of metal, and comprises a generally cylindrical, tubular body portion 2 having its inlet end 4 threaded internally to fit over and engage with a threaded portion 5 of the end of an old service pipe 6 extending into the building. The outer surface of the inlet end of the fitting is formed with a grooved, knurled, corrugated, or other suitable shape 7 to facilitate tightly screwing the fitting on the old service pipe 6. An annular groove 8 is provided at the base of the threaded portion 5 of the old service pipe 6 to assure clearance for the end thereof. The threaded portion 4 of the fitting 1 is preferably formed with a standard taper pipe thread to form a pressure resisting joint between the service pipe and the fitting.

An intermediate portion 10 of the fitting 1 is formed with a shoulder or flange having a bore 11 of proper diameter to receive the end of a replacement tube 12. The bore 11 is formed with an axial length sufficient to give it adequate strength to support the tube. An annular gasket recess 14 is formed adjacent the wall of bore 11, the side of the recess being preferably chamfered or beveled inwardly as indicated at 15 to furnish a wedge-like surface to aid in seating a gasket 16 backed by a gasket follower 17.

The fitting 1 has its outlet end 19 threaded internally as indicated at 20 and externally as indicated at 21. The internal thread is adapted to receive an externally threaded bushing 22 having an opening of the proper diameter to receive the end of the replacement tube 12. The outer end of the bushing 22 is formed with a grooved or other suitable surface to facilitate screwing it in place. The external thread 21 is preferably a standard pipe thread to make a tight joint with a standard screwed pipe fitting such as L 23.

The gasket 16 is preferably formed of resilient deformable material such as a natural or synthetic rubber compound or the like. Preferably, the gasket 16 is backed by a gasket follower 17 of angular cross section which is interposed between the gasket and the bushing 22 to facilitate rotation of the latter as it is screwed into position. It will be seen that when the bushing is screwed into the body portion 2, pressure will be applied to the gasket follower 17 and transmitted to the gasket 16. The beveled wall 15 will aid in causing the gasket 16 to tightly hug the replacement tube and form a wedge-type, leak-proof seal between the tube and the inner surface of the fitting.

A typical installation in which the fitting is used is shown in Fig. 1. The old service pipe 6 extends from the excavation about the main 25 through the ground and the building wall 26 to the interior of the building where it is connected to the fitting 1. The outlet of the fitting is connected through any suitable fitting such as an L fitting 23 to the building piping which may be a riser pipe 27 connecting through a pipe union 28 in the pipe to a meter 29. The replacement tube 12 is attached to the main 25 by a fitting 30 and extends through the old service pipe to the fitting 1.

In installing the replacement service tube, a small excavation is made at the point where the old service pipe 6 joins the main 25 and the outer end of the old service pipe is cut off as indicated at 31. The inner end of the old service pipe 6 is cut off inside the building and pipe-threaded as indicated at 5. The replacement service tube 12 is then inserted through the disconnected old service pipe 6 and the outer end of the tube is connected to the main 25 by use of the service fitting 30, the inner end of the tube being connected to the fitting 1. In installing the fitting 1, it is first screwed onto the end of the old service pipe 6 with the inner end of the replacement tube 12 extending therethrough. The gasket 16 and its follower 17 are secured in place by the bushing 22. It will be seen that a gas and water tight connection has been made for the inner end of the old service pipe 6 so that the entry of gas or water into the building is prevented. Further, the tube 12 has been secured in a leak-proof connection with the fitting 1. To complete the installation, the L fitting 23 and the riser pipe to the meter are attached in the usual manner.

In Fig. 3 another embodiment of the invention is illustrated in which corresponding parts are designated by the same reference numerals as in Figs. 1 and 2 with the addition of 100. In Fig. 3 there is shown a fitting 101 which is adaptable for use in connecting a replacement tube 112 which has a diameter considerably less than the diameter of the old service pipe 106. This fitting is of particular use in renewing an old low pressure gas service with a new high pressure service. Where pressures are increased on a gas system, the services therefor may be much smaller than those required for the low pressure system and still deliver a sufficient quantity of gas.

The fitting 101 is formed with a cross section of U-shape and having a passage 111 of proper diameter to receive the replacement tube 112. An annular gasket recess 114 is formed in the wall of the passage 111. A gasket recess may be formed by widening an end of the passage 111. The end of the recess is preferably chamfered or inwardly beveled as indicated at 115 to form a wedge-like surface in seating a gasket 116 backed by a gasket follower 117. The fitting 101 is threaded internally at one end of the passage 111 as indicated at 120, and threaded internally and externally as indicated at 121. The internal thread is adapted to receive the threaded end of the old service pipe 106 while the external thread is engaged in the end of an L 123 which may be connected in a piping system as previously described.

The fitting 101 is advantageous in that the old service pipe need not be cut off at its inner end, the existing pipe thread being used for connecting to the fitting and the new L being screwed onto the fitting in substantially the same position as that occupied by the original L. The replacement service is connected to the fitting prior to the attachment of the new L.

It is thus apparent that a fitting has been provided in accordance with the invention which overcomes the difficulties and disadvantages of the prior fittings. A tamper-proof installation is provided in which the sealing gasket is held in position by an inaccessible bushing. The fitting is adaptable to connect the replacement tube to the existing building piping and to simultaneously seal off the old service pipe against the entry of gas or water into the building. A construction is provided which is economical to manufacture, rugged in construction and durable in use. The installation of a replacement service tube may be made with a minimum disturbance to the existing piping in the building.

While the invention has been described and illustrated with reference to a specific embodiment thereof, it will be understood that other embodiments may be resorted to without departing from the invention. Therefore, the form of the invention set out above should be considered as illustrative and not as limiting the scope of the following claims.

I claim:

1. In a fitting for connecting the piping of a building in fluid-tight relationship with a replacement tube extending through a discontinued service pipe, a body member having an inlet and an outlet adapted to be connected to said service pipe and said building piping, respectively; and a passage therebetween adapted to receive the replacement tube longitudinally adjustable and slidably engaged with the body member, gasket means for providing a fluid tight seal between the outer wall of the tube and the passage, and means for applying pressure to the gasket, said pressure applying means being positioned within the body member.

2. In a fitting for connecting the piping of a building with a replacement tube extending through a discontinued service pipe, the tube terminating beyond the end of the service pipe, a fitting body adapted to be connected at its outlet end to the building piping and at its inlet end to the service pipe, and having a bore to receive the tube, gasket means for providing a fluid tight seal between the outer wall of the tube and the bore of the fitting, and gasket pressure applying means for slidable engagement with said tube positioned within the fitting body and adapted to be inaccessible from the exterior of an assembled piping system, the tube secured within the fitting body solely by compression of the gasket means.

3. In a service head fitting for connecting the piping of a building with a replacement tube extending through a discontinued service pipe, a fitting body having an inlet and an outlet and a bore therebetween to receive the tube, means adapted to connect the outlet end of the fitting with the building piping, means adapted to connect the inlet end of the fitting with the service pipe, gasket means for providing a fluid tight seal between the outer wall of the tube and the bore of the fitting, and gasket pressure applying means being positioned within the fitting body and adapted to be enclosed by the building piping, the tube longitudinally adjustable and slidably engaged with the fitting body and the gasket pressure applying means.

4. In a service head fitting for connecting the piping of a building with a replacement tube extending through a discontinued service pipe, a fitting body having a passage therethrough to receive the tube, means adapted to connect one end of the fitting with the building piping, means adapted to connect the other end of the fitting with the service pipe, gasket means for providing a fluid tight seal between the outer wall of the tube and the bore of the fitting, and a bushing engaging with the inner wall of the fitting to apply pressure to the gasket, the tube longitudinally adjustable within the fitting body in slidable engagement with the bushing and secured therein solely by compression of the gasket means.

5. In a service head fitting for connecting the piping of a building with a replacement tube extending through a discontinued service pipe, a fitting body having a passage therethrough to receive the tube, one end of the fitting having external and internal threads, the outer threads adapted to engage with threading on the building piping, the other end of the fitting having internal threads to engage with threading on the service pipe, gasket means for providing a fluid tight seal between the outer wall of the tube and the inner wall of the fitting, and a bushing threadedly engaging with the internal threads of the said one end of the fitting to apply pressure to the gasket.

6. In a service head fitting for connecting the piping of a building with a replacement tube extending through a discontinued service pipe, the tube extending beyond the end of the service pipe, a fitting body having an inlet portion of enlarged internal diameter adapted to threadedly engage with the outer surface of the service pipe and an outlet portion of enlarged internal diameter having threaded internal and external surfaces, the outer surface adapted to threadedly engage with the inner surface of the building piping, the fitting body having an intermediate flange portion provided with a bore of reduced internal diameter adapted to receive the replacement tube and having a gasket recess, a gasket in the recess, and a bushing having a threaded outer surface adapted to engage with the internal threaded surface of the outlet and to apply pressure to the gasket to provide a fluid tight seal between the outer wall of the tube and the inner surface of the intermediate flange portion of the fitting.

7. In a service head fitting for connecting the piping of a building with a replacement tube extending through a discontinued service pipe, the tube extending beyond the end of the service pipe, a fitting body having an inlet portion of enlarged internal diameter adapted to threadedly engage with the outer surface of the service pipe and an outlet portion of enlarged internal diameter having threaded internal and external surfaces, the outer surface adapted to threadedly engage with the inner surface of the building piping, the fitting body having an intermediate flange portion provided with a bore of reduced internal diameter adapted to receive the replacement tube and provided with a beveled inner shoulder and having a gasket recess, a gasket in the recess, and a bushing having a threaded outer surface adapted to engage with the internal threaded surface of the outlet and to apply pressure to the gasket to provide a fluid tight seal between the outer wall of the tube and the inner shoulder of the intermediate flange portion of the fitting.

8. In a fitting for connecting the piping of a building in fluid-tight relationship with a replacement tube extending through a discontinued service pipe, a body member having a passage therethrough adapted to receive the replacement tube longitudinally adjustable therein, gasket means for providing a fluid tight seal between the outer wall of the tube and the passage, and means for applying pressure to the gasket, said pressure applying means being positioned within the body member, the body member adapted to have conduit means secured over it to enclose said pressure applying means and adapted to be connected to the building piping, the tube slidably engaged with the body member and secured therein solely by compression of the gasket means.

9. In a fitting for connecting substantially concentric coextensive tubular members to a piping system, a body member having an inlet and an outlet adapted to be connected to the outer of said concentric tubular members and said piping system, respectively; and a passage therebetween adapted to receive the inner of said concentric tubular members longitudinally and slidably adjustable therein, gasket means for providing a fluid tight seal between the outer wall of said inner tubular member and the passage and for securing the said inner tubular member within the body member, and means for applying pressure to the gaskets, said pressure-applying means being adapted to be wholly enclosed by a portion of said piping system.

CHARLES E. SCHUMAN.

REFERENCES CITED

The following references are of record in the file of this patent:

UNITED STATES PATENTS

| Number | Name | Date |
|---|---|---|
| 1,012,777 | Wigle | Dec. 26, 1911 |
| 1,584,394 | Munley | May 11, 1926 |